United States Patent [19]

Solo

[11] 3,908,507

[45] Sept. 30, 1975

[54] WOOD ANCHORING NAIL

[75] Inventor: Alan J. Solo, Brooklyn, N.Y.

[73] Assignee: Knock-N-Lok International, Inc., Brooklyn, N.Y.

[22] Filed: Mar. 25, 1974

[21] Appl. No.: 454,393

[52] U.S. Cl. .................................................. 85/30
[51] Int. Cl.² ......................................... F16B 15/00
[58] Field of Search........................... 85/30, 19, 21

[56] References Cited
UNITED STATES PATENTS

| | | | |
|---|---|---|---|
| 1,274,923 | 8/1918 | Meyner | 85/44 |
| 1,332,059 | 2/1920 | Norwood | 85/21 |
| 1,410,076 | 3/1922 | Overbury | 85/30 |

FOREIGN PATENTS OR APPLICATIONS

| | | | |
|---|---|---|---|
| 9,961 | 1901 | United Kingdom | 85/30 |

*Primary Examiner*—Edward C. Allen
*Attorney, Agent, or Firm*—Friedman & Goodman

[57] ABSTRACT

A wood nail includes an elongate shank having converging surfaces at one end thereof to form a cutting edge suitable for being driven into wood. A slotted head is provided at the other end of the shank. An anchoring portion is provided in the region of the cutting edge, the anchoring portion projecting laterally of the shank in a direction substantially normal to the axial length of the latter to form an anchoring shoulder with the major portion of the shank. The shoulder faces in the direction of the head. The anchoring portion has a transverse dimension greater than the axial dimension thereof and has a cutting surface facing the direction of rotation when the nail is turned about its axis. With this construction, the cutting surface is made sufficiently small to facilitate turning of the nail after being driven into the wood by engagement of the slotted head with a suitable tool and the shoulder is made sufficiently large to assure good anchoring of the nail in the driven position after being turned angularly about the axis thereof from the initial driven position due to engagement of the shoulder with the wood.

3 Claims, 5 Drawing Figures

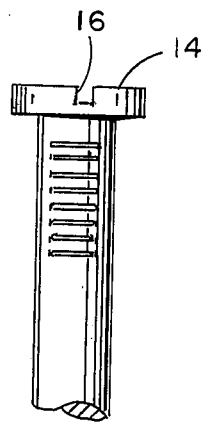
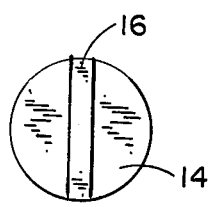
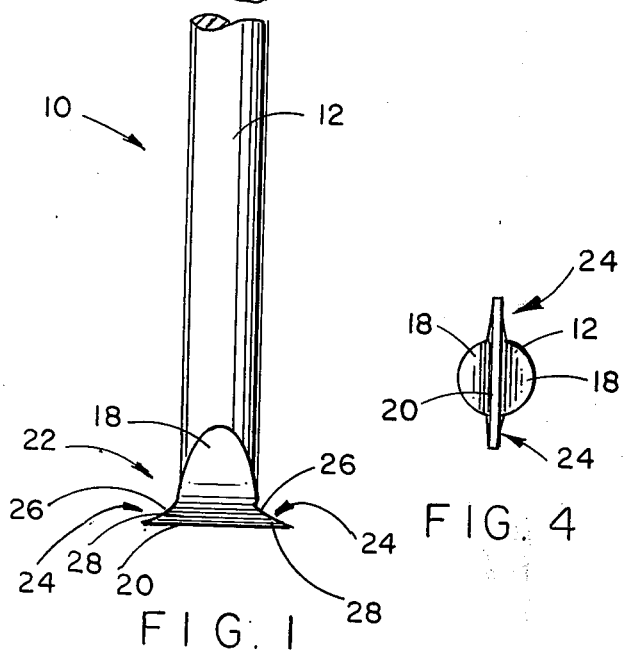
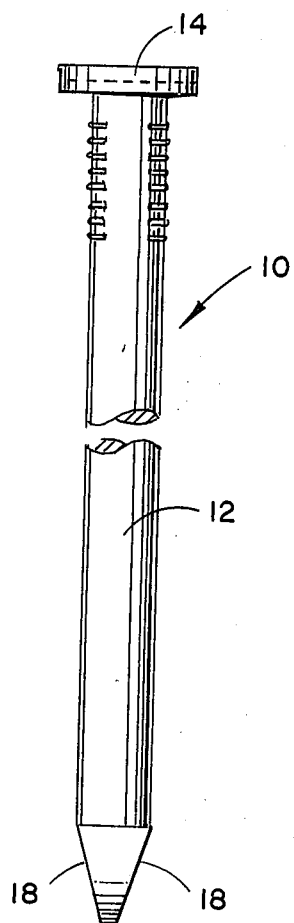
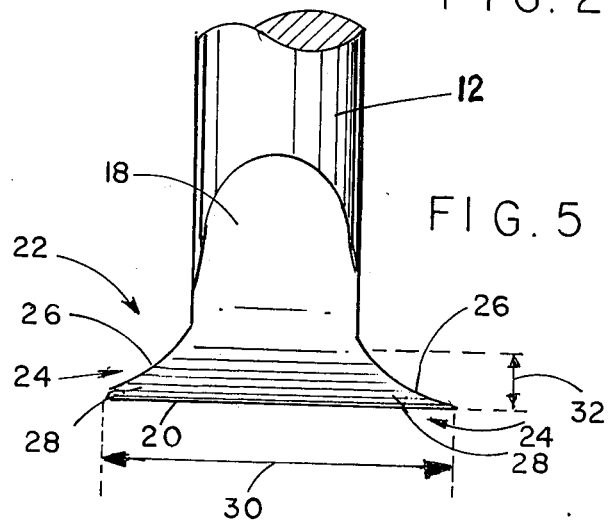

WOOD ANCHORING NAIL

BACKGROUND OF THE INVENTION

The present invention generally relates to wood fasteners, and particularly to a wood nail which is provided with an anchoring portion at one end thereof and a head at the other end thereof which may be engaged to turn the nail, the anchoring portion being configurated to provide a small cutting surface to permit turning of the nail after being driven into wood and a large anchoring shoulder area to anchor the nail after being turned in the wood.

Variously configurated nails are known in the prior art. Many of the known nails have differently shaped driving tips, designed primarily to prevent splitting of the wood into which they are driven or to enhance anchoring action.

A nail is disclosed in U.S. Pat. No. 1,410,076, for example, which is adapted for use in preparing roofing on foundations of concrete or Portland cement. The nail in this patent includes a slotted head at one end and a flattened, spear head-shape at the other end which forms, with the cylindrical shank of the nail, a pair of lateral transverse shoulders. The known nail is suitable for use in cement foundations before the latter become hardened, and while the cement is still to some extent "green". When the nail is turned or rotated after it is driven into the cement, the soft cement flows around and covers the shoulders and fixes the position of the nail when the cement becomes hardened. However, the nail described in this patent exhibits a flat cutting surface which is relatively large compared to the overall dimensions of the nail. More specifically, the axial length of the flat surface of the known nail is greater than the width thereof in the region of the shoulders. Thus, while this prior art nail may be used in soft concrete or cement, it cannot be utilized as an anchoring fastener for wood. The structure of the known nail is such that rotation of the same is possible in a soft medium but impossible in a hard medium such as wood without shearing the nail along its length. In essence, the usefulness of the nail of this patent is largely made possible by the characteristics of soft, flowing cement, which surrounds and completely encloses the nail, including discontinuities such as shoulders thereon. Such a nail, clearly, cannot be utilized in conjunction with a non-flowing medium such as wood.

SUMMARY OF THE INVENTION

Accordingly, it is an object of the present invention to provide an anchoring wood nail which does not exhibit the disadvantages of the above prior described conventional nails.

It is another object of the present invention to provide an anchoring wood nail which can be anchored in wood and which is simple in construction and economical to manufacture.

It is still another object of the present invention to provide a wood nail of the type under discussion whose structure facilitates the rotation of the nail subsequent to being driven into wood yet provides sufficient anchoring characteristics to prevent the nail from moving with respect to the wood in the anchored position.

In order to achieve the above objects, as well as others which will become apparent hereafter, a wood nail in accordance with the present invention comprises an elongate shank. Said shank has converging surfaces at one end thereof to form a cutting edge suitable for being driven into wood. An engageable head is provided at the other end of said shank. An anchoring portion is provided in the region of said cutting edge which projects laterally of said shank in a direction substantially normal to the axial length of the latter to form an anchoring shoulder with the major portion of said shank. Said shoulder faces in the direction of said head. Said anchoring portion has a transverse dimension greater than the axial dimension thereof and has a cutting surface facing the direction of rotation when the nail is turned about its axis. In this manner, said cutting surface is made sufficiently small to facilitate turning of the nail after being driven into wood by engagement of said head with a suitable tool. Simultaneously, said shoulder is made sufficiently large to assure good anchoring of the nail in the driven position after being turned angularly about the axis thereof from the initial driven position due to engagement of said shoulder with the wood.

In accordance with the presently preferred embodiment, said axial dimension is substantially smaller than said transverse dimension thereof. In this manner, the ratio of said cutting surface to shoulder dimensions is minimized. Said shoulder may be rounded or may be abrupt and substantially normal to the axis of said shank. The greater the discontinuity which abuts against a solid body of wood subsequent to turning of the nail the greater the anchoring characteristics thereof. Advantageously, two shoulders are provided on diametrically opposing sides of said shank.

To facilitate turning of the screw after the latter has been driven into wood, said cutting surface may be inclined relative to the cutting direction to form a cutting edge.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 is a fragmented front elevational view of a nail in accordance with the present invention;

FIG. 2 is a fragmented side elevational view of the nail shown in FIG. 1;

FIG. 3 is a top plan view of the nail shown in FIG. 1;

FIG. 4 is a bottom plan view of the lower end of the nail shown in FIG. 1; and

FIG. 5 is an enlarged fragmented view of the lower end of the nail shown in FIG. 1, showing the details of the anchoring means which is suitable for use in wood.

DESCRIPTION OF THE PREFERRED EMBODIMENTS

Referring now specifically to the FIGURES, wherein identical or similar parts have been designated by the same reference numerals throughout, the nail in accordance with the present invention is generally indicated by the reference numeral 10.

The nail 10 includes a cylindrical shank 12 which is generally smooth, as with conventional nails. However, the present invention can also be used with a variety of other shank configurations, as will become clear hereafter. For example, the shank may include grooves or spirals and the like to improve the holding power of the nail. The shank 12 is provided at the upper end thereof, as viewed in FIGS. 1 and 2, with a flat head 14 provided with a slot 16 extending therethrough. With this arrangement, the nail may be turned about its axis by engagement of the slotted head with a suitable tool such as a screwdriver. However, the head 14 may assume any other shape or configuration which permits gripping or engagement thereof to turn the nail about the axis thereof. The slotted flat head shown forms part of the present preferred embodiment of the nail.

At the lower end of the shank 12, as viewed in FIGS. 1 and 2, the nail 1 is provided with converging surfaces 18 which form a cutting edge 20 suitable for being driven into wood.

An important feature of the present invention is the provision of an anchoring portion 22 in the region of the cutting edge 20 which projects laterally of the shank 12 to form diametrically opposing wings 24 which extend in a direction substantially normal to the axis of the shank to form, with the major portion of the shank 12, anchoring shoulders 26 which face in the direction of the head 14.

A can best be seen in FIG. 5, each of the wings 24 includes a cutting surface 28 which forms part of a respective converging surface 18. An important structural consideration in forming the anchoring portion 22 is that the latter exhibit a transverse dimension 30 which is greater than the axial dimension 32 thereof. Advantageously, the dimension 30 is substantially greater than the dimension 32. The dimension 30 is that distance between extreme diametrically opposing points along the anchoring portion 22 while the dimension 32 represents the height of the anchoring portion extending from the cutting edge 20 to that point where the transverse dimension of the anchoring portion become equal to the diameter of the shank 12. As shown in the drawings, the ratio of the dimension 32 to the dimension 30 is approximately 0.2. Advantageously, to facilitate turning of the nail, this ratio is maintained at or below this value.

As suggested above, the cutting surfaces 28 are made sufficiently small to facilitate turning of the nail after being driven into wood by engagement of the head with a suitable tool, such as a screwdriver. Simultaneously, the shoulder is made sufficiently large to assure good anchoring of the nail in the driven position after being turned angularly about the axis thereof from the initial driven position, due to engagement of the shoulders 26 with the solid body of wood above the shoulders subsequent to the turning step. Advantageously, the ratio of the diameter of the shank to the transverse dimension 30 is approximately 0.5 as shown in the drawings.

The above-described structional features make the nail 10 of the present invention particularly suitable for use in hard substances such as wood. Advantageously, the axial dimension 32 of the anchoring portion 22 is substantially smaller than the transverse dimension 30 thereof. In this manner, the ratio of the cutting surfaces 28 to the shoulder 26 dimensions is minimized. This is distinguishable from the nail disclosed in U.S. Pat. No. 1,410,076, wherein the transverse dimension of the flattened tip is less than the axial dimension thereof to thereby form a substantially higher ratio of cutting surface to shoulder dimension. As suggested above, the nail disclosed in this patent is so configurated that it may only be used in a soft substance, such as hardening cement or concrete and not in a hard material such as wood.

While the shoulders 26 of the preferred embodiment are shown as rounded and tapering between the extreme lateral points of the wings 24 and shank 12, the shoulders may be in the form of abrupt discontinuities wherein the same are substantially normal to the axis of the shank 12.

The presently preferred embodiment includes two shoulders 26 which are provided in diametrically opposing sides of the shank 12. However, it should be clear that many of the objects of the present invention may be achieved by providing a single wing or projection 24 and a single corresponding shoulder 26.

As described above, and best shown in FIG. 2, the cutting surfaces 28 are coincident with the converging surfaces 18. However, the cutting surfaces 28 may advantageously be inclined relative to the cutting direction or direction of rotation of the nail to form a cutting edge which further facilitates advancement of the cutting surfaces 28 or turning of the nail in the wood.

It may also be pointed out that while the cutting edge 20 has been shown as being straight, this cutting edge may also be curved and concave in relation to the region of advancement into the wood. However, where such rounding of the cutting edge is used, the rounding is advantageously minimal so as not to enhance or increase to any degree the overall height 32 of the anchoring portion 22, for the reasons described above.

The nail 10 may be turned in wood with little effort since the cutting surfaces are minimized. However, the anchoring characteristics of the nail are not compromised by reducing the cutting surfaces in this manner.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A nail comprising an elongate generally round shank, said shank having converging surfaces at one end thereof to form a cutting edge suitable for being driven into wood; an engageable head at the other end of said shank; and an anchoring portion in the region of said cutting edge which projects laterally of said shank along a direction substantially normal to the axial length of said shank to form therewith anchoring shoulders on diametrically opposing sides of said shank, said shoulders tapering from the major portion of said shank to form concave surfaces facing in the general direction of said head and merging with said cutting edge to form a point at each end thereof, said anchoring portion having a maximum transverse dimension and an maximum axial dimension, the ratio of said axial dimension to said transverse dimension being less than approximately 0.2, and the ratio of the diameter of said shank to said transverse dimension being approximately 0.5, whereby said converging surfaces on said anchoring portion form cutting surfaces sufficiently small to facilitate turning of the nail after being driven into a relatively hard penetrable material by engagement of said head with a suitable tool, and said shoulder is made sufficiently large to assure good anchoring of the nail in the driven position, after being turned angularly about the axis thereof from the initial driven position, due to engagement of said shoulder with the penetrable material.

2. A wood nail as defined in claim 1, wherein said converging surfaces form cutting surfaces which face the direction of rotation when the nail is turned about its axis, said cutting surfaces having said transverse and axial dimensions of said anchoring portion.

3. A wood nail as defined in claim 1, wherein said head is slotted, whereby the nail may be turned about its axis by engagement of said slotted head with a suitable tool such as a screwdriver.

* * * * *